United States Patent
Childree

[11] Patent Number: 6,152,354
[45] Date of Patent: Nov. 28, 2000

[54] BRAZING FILLER ALLOY CONTAINING CALCIUM

[75] Inventor: David L. Childree, Livermore, Calif.

[73] Assignee: Kaiser Aluminum & Chemical Corporation, Pleasanton, Calif.

[21] Appl. No.: 09/056,662

[22] Filed: Apr. 8, 1998

Related U.S. Application Data

[60] Provisional application No. 60/041,851, Apr. 9, 1997.

[51] Int. Cl.⁷ .......................... B23K 31/02; B23K 35/22; B23K 35/363
[52] U.S. Cl. ...................... 228/206; 228/262.51; 228/219
[58] Field of Search ...................... 228/183, 218, 228/219, 220, 205, 206, 207, 262.51

[56] References Cited

U.S. PATENT DOCUMENTS

| | | |
|---|---|---|
| 3,831,265 | 8/1974 | Louzon et al. ........................ 29/592.1 |
| 3,843,333 | 10/1974 | Woods . |
| 3,951,328 | 4/1976 | Wallace et al. . |
| 4,203,490 | 5/1980 | Terai et al. ............................ 165/134.1 |
| 4,502,899 | 3/1985 | Tsuji et al. ............................ 148/431 |
| 4,586,964 | 5/1986 | Finnegan et al. . |
| 4,619,716 | 10/1986 | Suzuki et al. ............................ 148/26 |
| 4,699,674 | 10/1987 | Finnegan . |
| 4,781,888 | 11/1988 | Hagiwara et al. . |
| 5,102,033 | 4/1992 | Woods et al. . |
| 5,398,864 | 3/1995 | Eichhorn et al. . |
| 5,564,619 | 10/1996 | Childree . |

FOREIGN PATENT DOCUMENTS

| | | |
|---|---|---|
| 59-100249 | 6/1984 | Japan ............................ 228/262.51 |
| 3-19291 | 3/1991 | Japan . |
| 629048 | 9/1949 | United Kingdom . |
| WO 97/36709 A1 | 10/1997 | WIPO . |

Primary Examiner—Samuel M. Heinrich
Attorney, Agent, or Firm—Jones, Tullar & Cooper

[57] ABSTRACT

Minor additions of calcium (Ca) to Al—(1% to 14%) Si filler metals result in larger fillets than conventional Al—Si alloys normally used in the NOCOLOK brazing process. This new filler metal can be clad to 2XXX, 3XXX, 6XXX, and 7XXX series alloys and brazed with a fluoride flux. The filler metal contains between 0.005% Ca to 0.3% Ca. The new filler metal could have up to 0.3% Mg and up to 0.3% Li. Additionally, the brazing process can optionally include an aqueous treatment with a fluoride salt to reduce the need for NOCOLOK fluxing.

14 Claims, 7 Drawing Sheets

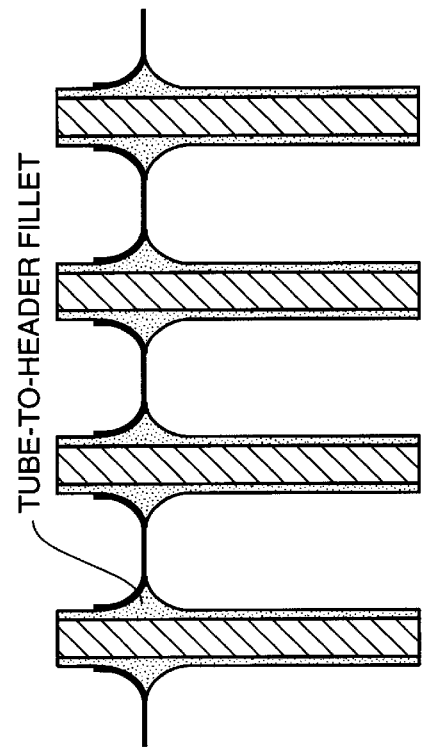
FIG._1C
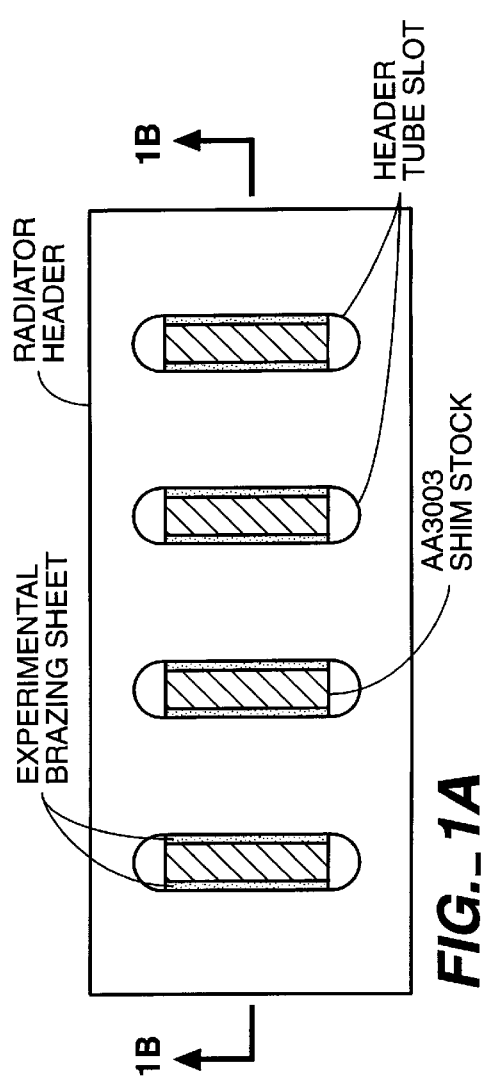
FIG._1A
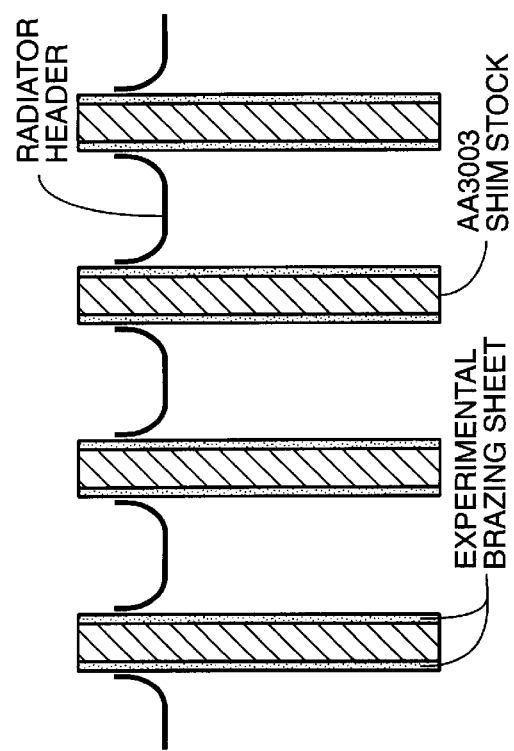
FIG._1B

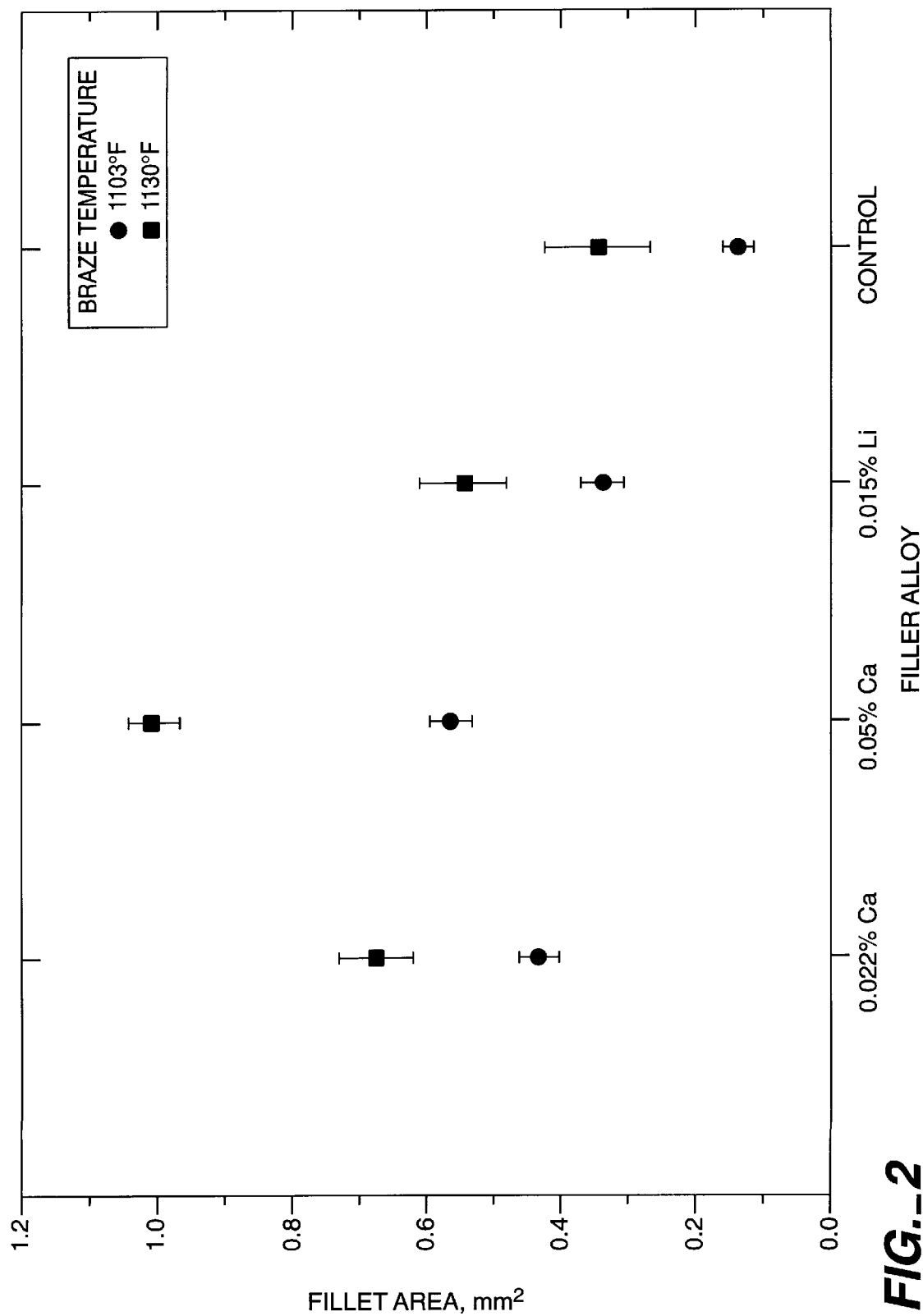
FIG._2

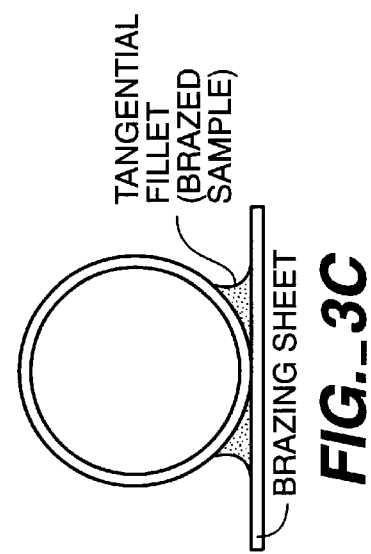
FIG._3C
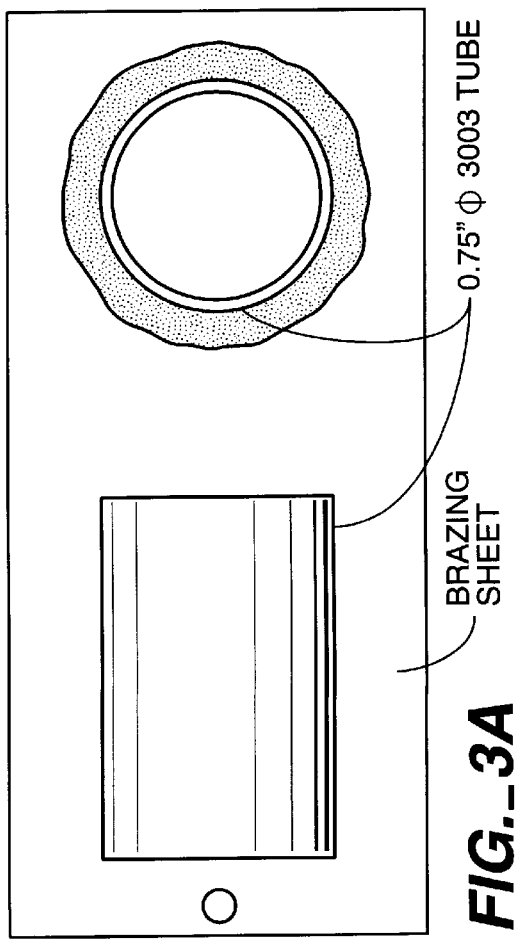
FIG._3A
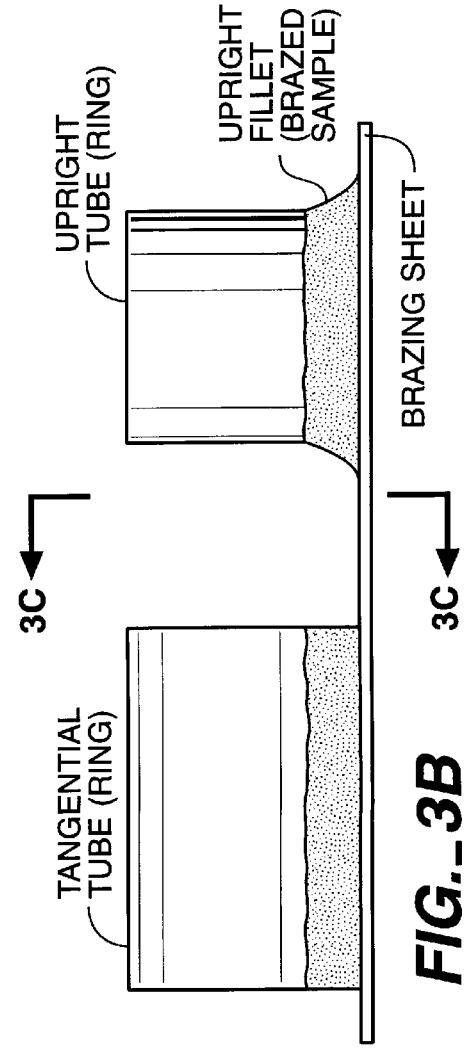
FIG._3B

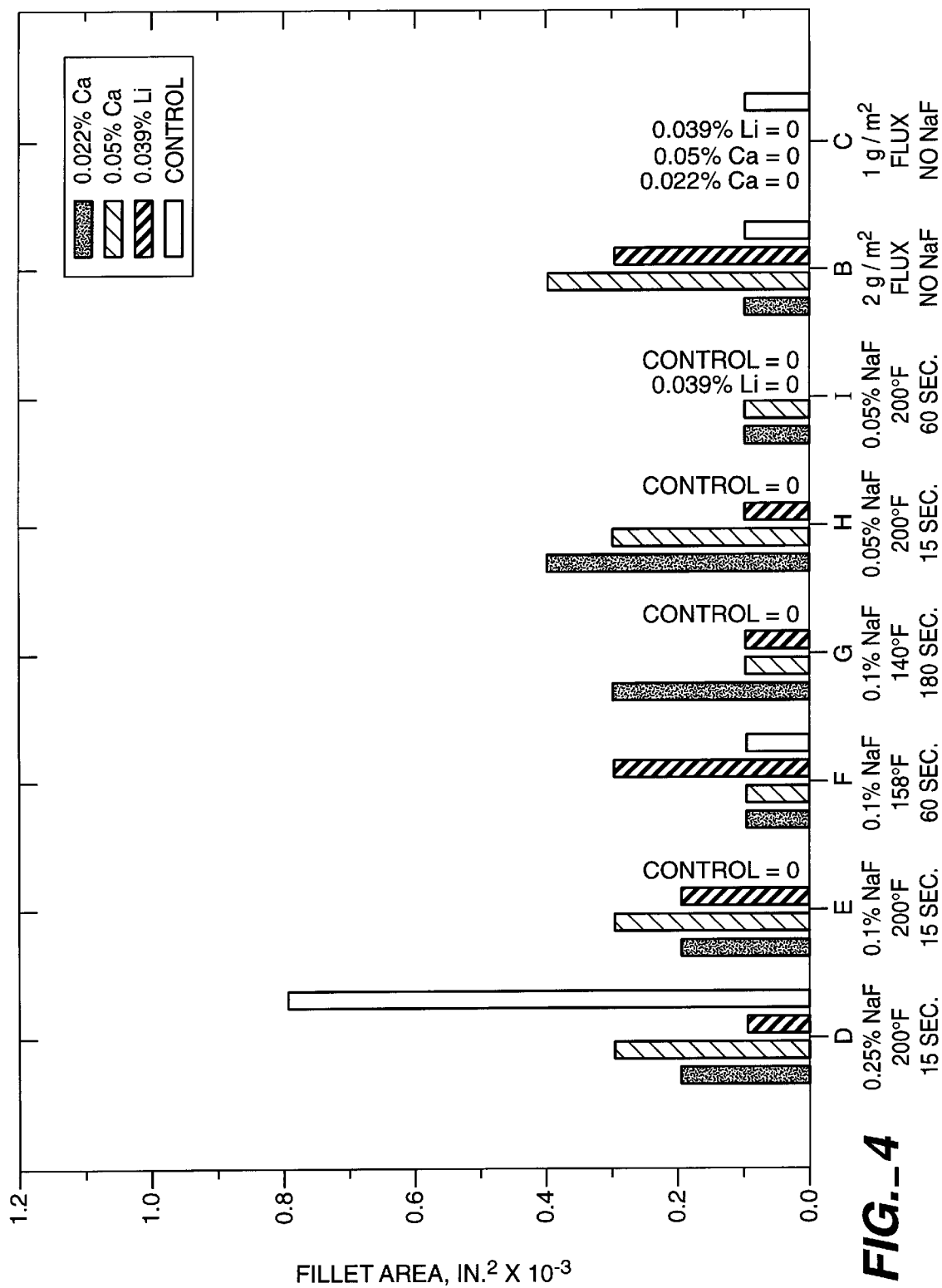
FIG._4

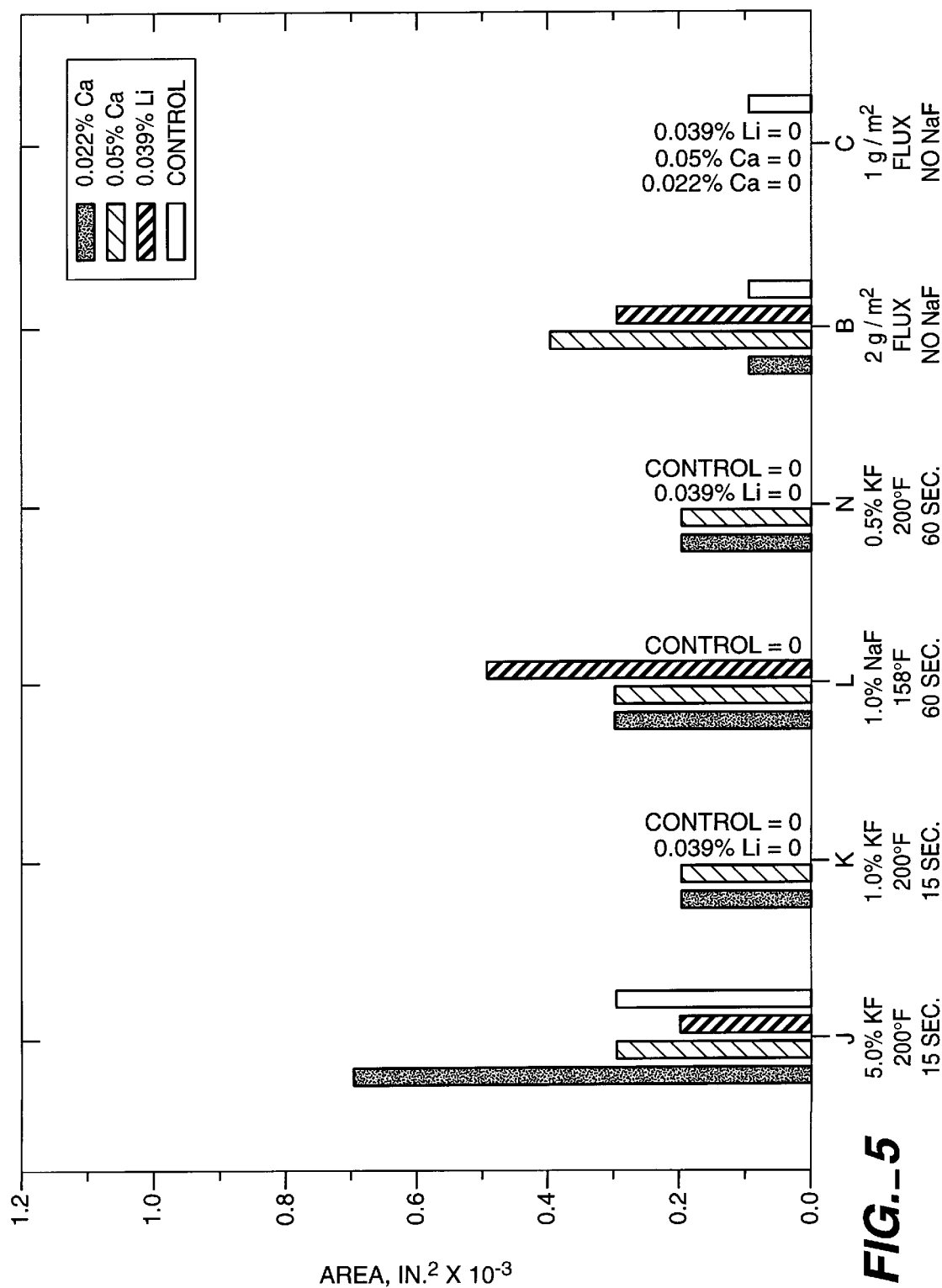

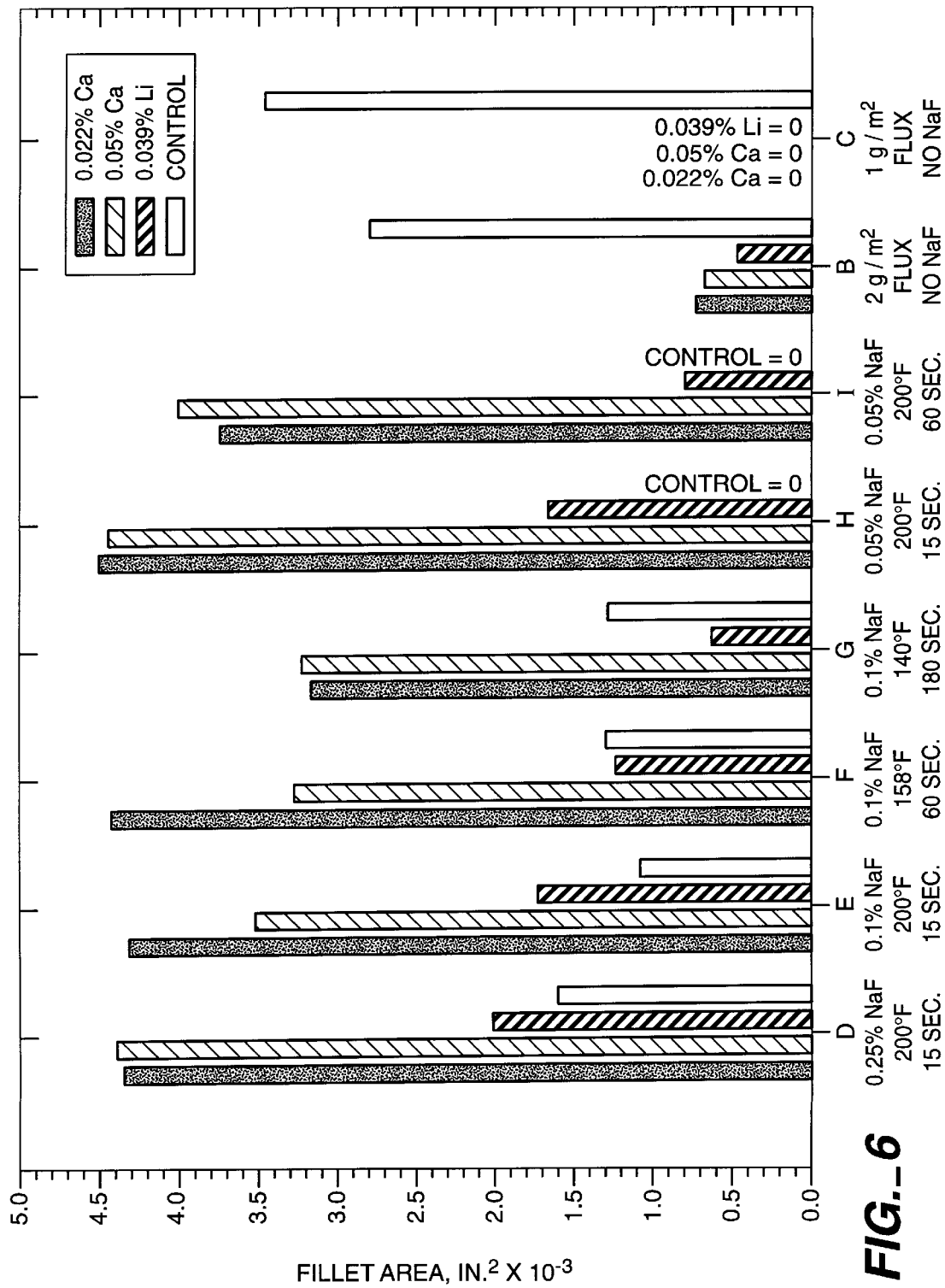
FIG._6

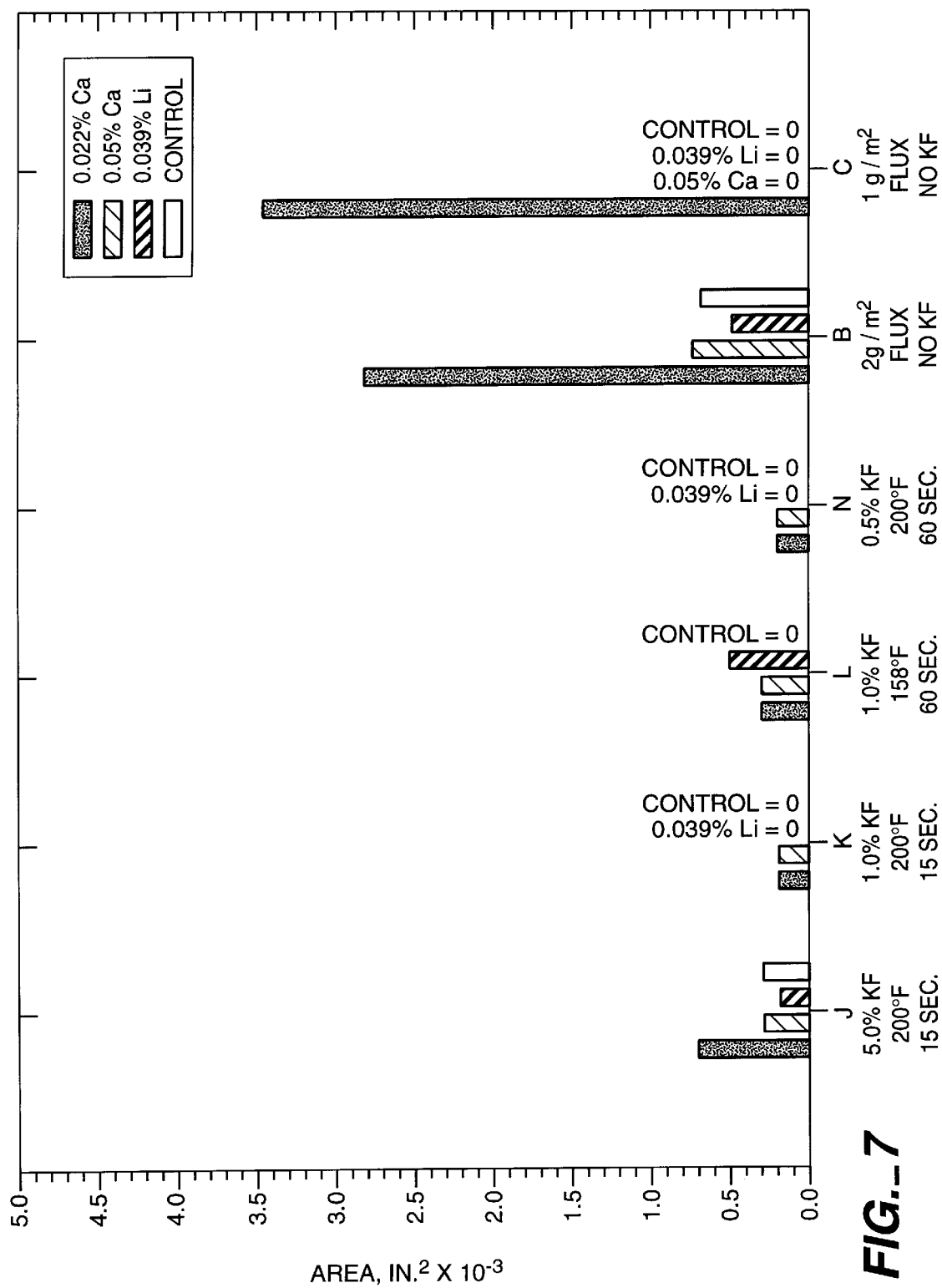
FIG._7

BRAZING FILLER ALLOY CONTAINING CALCIUM

The present application derives benefit from Provisional Application 60/041851 filed Apr. 9, 1997.

FIELD OF THE INVENTION

The present invention relates to brazing aluminum articles. More specifically, the present invention relates to a specific cladding (filler) alloy and a process for brazing aluminum articles using the clad alloy.

BACKGROUND OF THE INVENTION

NOCOLOK™ flux brazing has been used as the principal brazing process to braze radiators by the major heat exchanger manufacturers. Major problems that have arisen from the NOCOLOK process have been flux cost and the damage that flux causes to the furnaces. Consequently, most of the major heat exchanger manufacturers have been trying to reduce flux consumption. Brazing sheet materials with enhanced brazeability may allow the heat exchanger manufacturers to reduce flux consumption and still develop satisfactory joints, while simultaneously reducing their cost and furnace maintenance. If materials existed that resulted in lower flux consumption while creating stronger joints, this would represent an advantage in CAB (controlled atmosphere brazing) processes.

BRIEF DESCRIPTION OF THE DRAWINGS

FIG. 1. Describes the mini-radiator test sample used to evaluate the influence of clad metal alloy composition on the tube-to-header fillet size.

FIG. 2. The relationship between tube-to-header fillet areas and clad metal composition.

FIG. 3. A sketch of the "box-ring" sample used to evaluate the effect of sample geometry on the fillet sizes of the experimental clad alloys treated with the fluoride solutions before inert atmosphere brazing.

FIG. 4. Shows the effect of the NaF fluoride treatments on the box ring upright fillet areas.

FIG. 5. Depicts the effect of the KF fluoride treatments on the box ring upright fillet areas.

FIG. 6. Shows the effect of the NaF fluoride treatments on the box ring tangential fillet areas.

FIG. 7. Shows the effect of the KF fluoride treatments on the box ring tangential fillet areas.

SUMMARY OF THE INVENTION

The present invention is a product and process for brazing an aluminum alloy core. The product is an aluminum alloy that comprises between 1.0% (preferably 0.3%) and 0.005% calcium and between 1% and 14% silicon. The present brazing process comprises brazing a calcium and silicon containing aluminum alloy under controlled atmosphere brazing conditions. The present brazing process preferably includes an aqueous fluoridic wash.

Among other factors, it has been discovered that the use of very low levels of calcium in the cladding alloy produces larger fillet areas when used in controlled atmosphere brazing. It has also been discovered that these stronger joints may be produced without using flux if the novel clad alloy is used in combination with an aqueous flouridic treatment.

More specifically, the present invention is a process for controlled atmosphere brazing, comprising: brazing an aluminum alloy under controlled atmosphere conditions, the alloy comprises aluminum and between 0.005 and 0.1% calcium; 7 and 12% silicon; between 0.04% and 0.1% magnesium; between 0.01% and 0.06% lithium; less than 0.3% iron; less than 0.08% zinc; less than 0.1% copper; less than 0.05% manganese; and no more than 0.15% impurities;

DETAILED DESCRIPTION OF THE INVENTION

This invention relates to the brazing of aluminum articles. More particularly, this invention relates to a low calcium, novel aluminum clad alloy suitable for the brazing of aluminum alloy articles preferably by the controlled atmosphere brazing process. Preferably, the brazing process also includes the use of an aqueous fluoridic treatment.

For the purposes of this invention, and as used hereinafter, the term "controlled atmosphere brazing" or "CAB" refers to a brazing process which utilizes an inert atmosphere, for example, nitrogen, argon or helium in the brazing of aluminum alloy articles. "Core" means an aluminum alloy which is the structural support for the aluminum alloy that is used as the filler. "Filler" means an aluminum alloy which is used to braze the core or other aluminum articles. "Cladding" is used to describe the use of the filler when it is overlaid on one or both surfaces of the core. Thereafter, the clad core is called a composite or a brazing sheet. "Fillet" means a concave junction between two surfaces. NOCOLOK™ flux brazing is described in U.S. Pat. No. 3,951,328 which is hereby incorporated by reference in its entirety.

The presently preferred filler alloy contains aluminum as a major constituent, and can contain many of the following alloying elements, such as calcium, silicon, manganese, lithium, copper, zinc, iron, magnesium, chromium, and titanium. Calcium and silicon are required in the aluminum alloy and the other elements are optional. The preferred alloy has the above elements in the following ranges as measured by weight percent (wt %). The upper limit of calcium can be 1.0%, but is preferably no more than 0.3%, more preferably no more than 0.1%, most preferably no more than 0.05% or 0.04%. The lower limit on calcium is preferably at least 0.005%, most preferably at least 0.015%. The upper limit of silicon is preferably no more than 14%, more preferably no more than 12%. The lower limit on silicon is preferably at least 1%, most preferably at least 7%. The upper limit of magnesium is preferably no more than 0.4%, more preferably no more than 0.1%. The lower limit on magnesium is preferably at least 0.0001%, more preferably no more than 0.04%. The upper limit of lithium is preferably no more than 0.3%, more preferably no more than 0.06%. The lower limit on lithium is preferably at least 0.0001%, most preferably at least 0.01%. Titanium is preferably less than 0.15%, iron is preferably less than 0.5%, manganese is preferably less than 1.5% or even 1.0%, but more preferably less than 0.1% or even 0.05%. Zinc is preferably less than 0.25 wt %. Other impurities should total less than 0.15% and/or 0.05% each.

The novel filler alloy is generally employed in the form of a brazing sheet rolled from ingots having the desired alloy composition. The filler is applied to the surface of the aluminum core alloy through cladding regardless of the brazing process. Cladding of the aluminum core alloy with the filler is accomplished by methods well-known in the art, for example by pressure welding through a rolling process. The filler may be applied to one or both sides of the aluminum core alloy depending on the assembly to be made. The thickness of the brazing sheet applied to one or both surfaces of the core alloy is usually within the range from about 5 to about 20%, more preferably from about 7 to 12%, of the thickness of the aluminum composite. For example, if the thickness of the aluminum composite is about 0.1 inch (2.54 mm), then the thickness of the cladding applied to the surface of the aluminum core can vary between 0.005 and 0.020 inch (0.127–0.508 mm).

The types of aluminum core alloys, which are clad with the novel filler are generally selected on the basis of the end use of the brazed assembly. Suitable aluminum core alloys which can be clad with the novel filler alloy composition include those aluminum alloys which are classified as 2XXX, 3XXX, 6XXX and 7XXX aluminum alloys by the Aluminum Association, the 2XXX, 3XXX, and 6XXX alloys are preferred. The clad aluminum composite may be subjected to heat treatment or cold working to improve its physical properties.

It is preferred that the brazing sheet of the present invention is used to make brazed heat exchanger assemblies, such as radiators and components for such heat exchangers. Radiators are generally constructed of tubes, fins, and headers. 'Tubes' are typically 3XXX core alloys clad with 4XXX filler metals, 'fins' are typically unclad 3XXX, and 'headers' are typically 3XXX core alloys clad with 4XXX filler metals. Other applications are also possible, for example, utilization of the aluminum alloy brazing composition in the manufacture of various types of heat exchangers, e.g., evaporators, heater cores, condensers, and transmission oil coolers.

The brazing of the assemblies made from the aluminum core alloys clad with the presently preferred brazing sheet is accomplished according to principles well-known in the brazing art. For a description of brazing techniques, alloys, and flux see Childree, "A New Al—Si—Li Filler metal that Enhances Brazeability of High-Strength Alloys in CAB and Vacuum", SAE Technical Paper Series, No. 960247, Int'l. Cong. and Exp., Detroit, Mich., Feb. 26–29, 1996, which is hereby incorporated by reference in its entirety. For example, in the CAB process, flux is applied to the brazing sheets to be joined, and the assembly is preheated to a temperature in the range from about 425°–475° F. (224°–246° C.). The assembly is transferred to a prebraze chamber where it is soaked for about 3–15 minutes at about 750° F. (399° C.). Subsequently, the hot assembly is transferred to the brazing furnace which is purged with dry nitrogen. The assembly is kept then for 2–3 minutes at about 1095° F.–1130° F. (591° C.–610° C.) in the CAB furnace. The brazed assembly is then cooled, removed, and applied for its intended use.

The presently preferred brazing sheet is advantageously combined with an aqueous flouridic treatment to improve the brazing process and to reduce flux consumption. The process is disclosed in U.S. Ser. No. 08/626,336, which is hereby incorporated by reference in its entirety. Generally, the process involves pre-treating a brazing sheet with an aqueous solution of a mixture aqueous fluoridic compounds for a relatively short time period. This pre-treatment can significantly improve the strength and soundness of the brazed joint. This pre-treatment is also advantageous because the treating solution is dilute, the disposal problems associated with the spent treating solution are minimized, and the short treatment period allows the assembly line type treatment of brazeable aluminum articles.

The aqueous surface treating or etching solution of the present invention contains fluoridic compounds. These compounds can include potassium fluoride (KF), sodium fluoride (NaF), hydrogen fluoride (HF), cesium fluoride (CsF), and nickel fluoride (NiF). The concentration of the fluoridic compounds in solution is preferably no more than 5 wt. %, more preferably no more than 1%. The lower range is preferably at least 0.005%, more preferably at least 0.05% (wt % of any or a mix of the fluoridic compounds). The pH of the flouridic wash is not controlled.

The dilute, aqueous flouridic solution is preferably heated to about 120° F. or 130° F. to 212° F., more preferably from about 150° F. or 160° F. to 205° F., when used in the pre-treatment process. Preferably, the brazing sheet is treated for at least 5 seconds to about 300 seconds, more preferably, it is treated for about 15 seconds to about 60 or 180 seconds. The above times may be adjusted depending on the temperature and concentration of the solution as elevated treatment temperatures and higher concentrations allow shorter treatment times. Selection of the temperature of the treatment, the treatment time and/or the concentration of the aqueous, fluoridic solution can be varied as noted above.

Preferably, the treated brazing sheet is rinsed with water and dried. However, rinsing may not always be necessary because of the use of relatively dilute solutions of the fluoride salts. The treated brazing sheet may be brazed after drying if it is not rinsed.

After the preparation noted above the alloys are brazed in the NOCOLOK™ flux brazing process as described in U.S. Pat. Nos. 3,951,328; 5,564,619; 5,398,864; 5,102,033; 4,699,674; and 4,586,964 which are hereby incorporated by reference in their entireties.

The fillet forming ability of the present filler alloy is significantly increased and the flux consumption is greatly reduced or eliminated when using the above process. Increased filler metal content in the brazed joint provides increased strength and greater fillet continuity for the joint while the absence of flux improves the corrosion resistance.

The following examples will further demonstrate the unique brazing capability of the present filler alloy using the CAB brazing process. Those skilled in the art will appreciate that the alloy of the present invention can also be used in dip brazing, furnace brazing, and brazing by torch heating, induction heating, resistance heating and other suitable means for achieving temperatures required for brazing.

EXAMPLE 1

Mini-radiator Samples NOCOLOK Fluxed and CAB Brazed

Filler alloys were made into small ingots (1"×6"×6") called "book molds" having the base composition shown in Table 1. Also described in Table 1 is the composition of the control material filler alloy, AA4343.

TABLE 1

Typical composition of the filler metal book molds.

| Element [1] | Experimental Filler Alloys | AA4343 Control |
|---|---|---|
| Si | 9.10–10.10, 9.50 desired | 7.15–7.5 desired 7.35 |
| Fe | 0.30 max. | 0.30 max. |
| Cu | 0.10 max. | 0.10 max. |
| Mn | 0.05 max. | 0.05 max. |
| Mg | 0.04 max. | 0.015 max. |
| Zn | 0.08 max. | 0.08 max. |
| Ti | — | None |
| Ca | 0.022 and 0.05 | — |
| Li [2] | 0.015–0.039 | — |

TABLE 1-continued

Typical composition of the filler metal book molds.

| Element [1] | Experimental Filler Alloys | AA4343 Control |
|---|---|---|
| Each | 0.05 | 0.05 max. |
| Other | 0.15 | 0.15 max. |
| Al | Balance | Balance |

[1] % by weight
[2] One Li alloy was compared to the Ca alloys, base composition of Li alloy identical Ca alloys.

Two calcium levels were cast, 0.022% and 0.05%, designated 0.022% Ca and 0.05% Ca, respectively. The Li alloy was made identically to the Ca alloys and had 0.015% Li in the filler. The book molds were scalped after casting and roll bonded to a 3105-type core alloy (K366). The 3105-type core alloy composition is described in Table 2. All experimental alloys were compared to a control material. The control material had a K323 core alloy, described in Table 2, clad with AA4343 filler metal. Both of these alloys are Mg-free.

The resulting brazing sheet/core composite had the following dimensions:
Thickness: 0.014 inches±0.001 inches
Clad thickness, % of total composite: 10%
Final temper: H24
Sides clad: One

TABLE 2

Typical 3105-type (K366) core alloy composition.

| Element | K366 Limits [1] | Control Material |
|---|---|---|
| Si | 0.10 max., desired 0.08 | 0.10–0.20, desired 0.15 |
| Fe | 0.25 max., desired 0.20 | 0.20–0.30, desired 0.25 |
| Cu | 0.28–0.38, desired 0.33 | 0.25–0.35, desired 0.30 |
| Mn | 1.00–1.20 | 1.05–1.25, desired 1.15 |
| Mg | 0.35–0.55, desired 0.45 | 0.010 max. |
| Zn | — | — |
| Ti | 0.10 max., desired 0.03 | 0.010–0.050 desired 0.015 |
| Ca | — | — |
| Li | — | — |
| Each | 0.05 max. | 0.05 max. |
| Other | 0.15 max. | 0.15 max. |
| Al | Balance | Balance |

[1] % by weight

After rolling the brazing sheet composites, mini-radiator samples of the type described in FIGS. 1A–C, were made to evaluate the brazeability of the alloys. FIG. 1A shows the pre-braze sample and FIG. 1C shows the post-braze sample. Mini-radiator samples are small assemblies which consist of tubes, fins, and headers pieced together to form tube-to-fin and tube-to-header joints for brazeability evaluation. Also see FIGS. 1 and 2 of Childree cited above.

Commercially made header plates were used to make all mini-radiator samples. All header plates were made by General Motors Harrison Radiator Division, Lockport, N.Y. The CAB brazed mini-radiator samples had header plates made with a 3003 core and a 4045 (no Mg) liner. The CAB brazed samples were brazed on their sides, with the longitudinal axis of the header parallel to the floor (sample rack) to simulate commercial production practices.

The flux loading was targeted at 5 g/m$^2$, the flux loading level typically used by commercial heat exchanger manufacturers. The samples were fluxed by dipping the samples into a flux-methanol slurry. Flux loading is controlled by changing the ratio of flux to methanol. The flux loading was controlled to within 10% of the target coverage.

The CAB furnace was purged with 100% dry $N_2$ (a dew point of –45° F. or lower) for about two hours before any brazing was done. This nitrogen was also used during brazing. The $N_2$ flow rate was approximately 1000 cfh. The braze temperature was about 1115° F.±15° F.

Sample temperatures were monitored and recorded on a digital data acquisition system. Typically, the temperature of the samples was controlled to within ±3° F. from the set point (which ranged from 1100° F. to 1130° F.). The number of samples run per load ranged from 15 to 30 samples.

Generally, the controlled atmosphere furnace brazing procedure was:

Preheat to 450° F. for 15 minutes

Transfer to the pre-heat chamber at 750° F. and hold for 15 minutes.

Transfer to the brazing chamber at 1115° F.±15° F.

Soak at braze temperature (1100° F.–1130° F.) for 3 minutes

Cool down

Remove from furnace

Mini-radiator samples made with the Ca-containing filler metals and brazed at 1100° F. developed fillet areas that were progressively larger as the Ca level was raised. When 0.022% Ca has been added to the filler metal, the fillet area increased approximately 200%, when compared to the control material. Increasing the Ca level to 0.05%, resulted in fillet areas that were about 300% larger than the control material, as depicted in FIG. 2 (data shown in Table 3). A similar effect was observed when the brazing temperature of these samples was raised to 1130° F. The addition of 0.022% Ca and 0.05% Ca resulted in fillet areas that were 175% and 250% greater than the control material. The brazing sheet material that contained Li developed fillets that were about equal to those of the 0.022% Ca alloy. The Ca bearing alloys developed the largest fillets in the mini-radiator samples at flux loading levels typically employed by heat exchanger manufacturers.

TABLE 3

Mini-radiator fillet areas, sq. mm.

| Composition | 0.022% Ca | 0.022% Ca | 0.05% Ca | 0.05% Ca | 0.015% Li | 0.015% Li | No Mg, Li, Ca | No Mg, Li, Ca |
|---|---|---|---|---|---|---|---|---|
| Braze Temp., ° F. | 1103 | 1130 | 1103 | 1130 | 1103 | 1130 | 1103 | 1130 |
| 1 | 0.4273 | 0.6406 | 0.5869 | 0.9557 | 0.2177 | 0.6823 | 0.1144 | 0.1784 |
| 2 | 0.4516 | 0.3158 | 0.5213 | 0.9582 | 0.2350 | 0.4232 | 0.1172 | 0.1338 |
| 3 | 0.4417 | 0.5309 | 0.5720 | 1.1034 | 0.2671 | 0.6022 | 0.1065 | 0.1072 |
| 4 | 0.4356 | 0.7104 | 0.5753 | 0.9828 | 0.3041 | 0.6070 | 0.1042 | 0.4506 |
| 5 | 0.4732 | 0.5801 | 0.5517 | 1.1050 | 0.2704 | 0.7552 | 0.1067 | 0.4024 |

TABLE 3-continued

Mini-radiator fillet areas, sq. mm.

| Composition | 0.022% Ca | 0.022% Ca | 0.05% Ca | 0.05% Ca | 0.015% Li | 0.015% Li | No Mg, Li, Ca | No Mg, Li, Ca |
|---|---|---|---|---|---|---|---|---|
| 6  | 0.5287 | 0.6969 | 0.4851 | 0.8041 | 0.2404 | 0.0428 | 0.1121 | 0.4554 |
| 7  | 0.4810 | 0.5814 | 0.4747 | 0.8566 | 0.2758 | 0.7509 | 0.1406 | 0.5144 |
| 8  | 0.5418 | 0.5740 | 0.5099 | 0.9808 | 0.2156 | 0.2195 | 0.0803 | 0.3337 |
| 9  | 0.3888 | 0.7629 | 0.5335 | 1.0715 | 0.2870 | 0.5806 | 0.0895 | 0.5048 |
| 10 | 0.3604 | 0.6207 | 0.4412 | 0.9572 | 0.3247 | 0.6163 | 0.1019 | 0.0438 |
| 11 | 0.4567 | 0.6576 | 0.5294 | 1.1273 | 0.2740 | 0.5426 | 0.0920 | 0.4397 |
| 12 | 0.3812 | 0.7813 | 0.6108 | 0.9613 | 0.2911 | 0.5666 | 0.0608 | 0.4605 |
| 13 | 0.3324 | 0.6569 | 0.5299 | 0.9869 | 0.2299 | 0.1927 | 0.0933 | 0.5787 |
| 14 | 0.3819 | 0.2085 | 0.4260 | 1.0520 | 0.2990 | 0.6115 | 0.0940 | 0.3063 |
| 15 | 0.4762 | 0.8307 | 0.4101 | 0.9856 | 0.2297 | 0.3520 | 0.0768 | 0.1053 |
| 16 | 0.3710 | 0.8065 | 0.4805 | 0.9646 | 0.2625 | 0.3138 | 0.1143 | 0.1630 |
| 17 |        | 0.7410 | 0.6637 | 1.1257 | 0.5088 | 0.6339 | 0.1325 | 0.0242 |
| 18 |        | 0.8786 | 0.5596 | 1.0160 | 0.3755 | 0.7674 | 0.0328 | 0.6924 |
| 19 |        | 0.4733 | 0.6321 | 1.0968 | 0.4162 | 0.6075 | 0.1472 | 0.0290 |
| 20 |        | 0.6138 | 0.6620 | 1.1605 | 0.3892 | 0.7930 | 0.0925 | 0.0983 |
| 21 |        | 0.6941 | 0.7134 | 1.0890 | 0.3997 | 0.7499 | 0.1464 | 0.5719 |
| 22 |        | 0.7879 | 0.6541 | 1.1817 | 0.4300 | 0.6883 | 0.1423 | 0.5696 |
| 23 |        | 0.7545 | 0.5958 | 1.0976 | 0.3474 | 0.5611 | 0.1730 | 0.2463 |
| 24 |        | 0.8231 | 0.5294 | 0.9314 | 0.4111 | 0.5621 | 0.1530 | 0.3294 |
| 25 |        | 0.6882 | 0.6346 | 0.9321 | 0.3604 | 0.4675 | 0.1514 | 0.5071 |
| 26 |        | 0.8590 | 0.5991 | 1.0626 | 0.3882 | 0.3010 | 0.2192 | 0.4272 |
| 27 |        | 0.8529 | 0.5109 | 0.9215 | 0.3711 | 0.5534 | 0.1889 | 0.7204 |
| 28 |        | 0.7349 | 0.7552 | 0.7324 | 0.5024 | 0.6059 | 0.1940 | 0.6431 |
| 29 |        | 0.7749 | 0.5745 | 0.9836 | 0.4458 | 0.5738 | 0.2108 | 0.3923 |
| 30 |        | 0.6028 | 0.7271 | 0.8427 | 0.4499 | 0.6479 | 0.2590 | 0.5980 |
| 31 |        | 0.8549 |        | 1.0436 | 0.4802 | 0.7231 | 0.2009 | 0.0489 |
| 32 |        |        |        | 1.0890 | 0.4346 | 0.4942 | 0.3701 | 0.0375 |

EXAMPLE 2

Box Ring Samples Fluoridic Treatments

All experimental and control alloys described in Example 1 were used in Example 2, except for the Li-containing alloy. Here, 0.039% Li was used in the filler metal.

After rolling, the experimental brazing sheet materials were trimmed to remove cracked edges and acetone wiped to remove rolling oils and other surface contamination.

The box ring samples shown in FIGS. 3A–C, were made with the brazing sheet described in Example 1. FIG. 3A shows the top view, 3B shows the end view, and 3C shows the side view. The brazing sheet has a top layer of the filler metal alloy and the bottom layer as the core alloy. Sheet samples used for the box ring were cut to size, vapor degreased in 1-1-1 trichlroloethane, assembled and re-cleaned in the vapor degreaser with 1-1-1 trichlroloethane. After cleaning, one set of samples, i.e., 0.022% Ca, 0.05% Ca, 0.039% Li, and the control, were fluxed with 2 g/m$^2$ and 1 g/m$^2$ of NOCOLOK flux and brazed in dry N$_2$ at 1110° F. for 5 minutes.

Sets (a set consists of 0.022% Ca, 0.05% Ca, 0.039% Li, and the control) of box ring samples were treated with the KF and NaF solutions, described in Table 4, and brazed. None of these samples were NOCOLOK fluxed. After fluoride treating these samples, they were brazing in dry N$_2$ at 1110° F. for 5 minutes, no flux was applied to these samples.

The samples were cut in half, between the tangential and upright rings. After sectioning, the sample halves were examined on an optical comparator; the fillets of the samples were traced, scanned into a computer and the fillet areas were measured with commercially available software. A sketch of the sample fillet areas is shown in FIG. 3.

The effect of the experimental KF and NaF treatments on the upright fillets formed with the experimental materials is shown in FIGS. 4–7 and in Tables 5–8. The data plotted in FIGS. 4 and 5 show that the NaF or KF fluoride treated and brazed box ring sample upright fillets were about the same size. We were surprised that the Ca and Li alloy typically formed upright fillets about equal to the control material (no Mg, Li or Ca) that was conventionally brazed with the NOCOLOK flux. Based on the results depicted in FIGS. 4 and 5, we can control atmosphere braze (CAB) NaF or KF treated Li or Ca filler metals clad to high Mg core alloys without NOCOLOK flux and expect that the upright fillet areas to be about equal to the NOCOLOK fluxed and brazed control material.

Tangential box ring sample fillets were significantly larger when the brazing sheet was treated with the NaF fluoride treatment. Sodium fluoride treated samples were typically 400% larger than their KF treated counterparts, as shown in FIGS. 6 and 7. When comparing NOCOLOK fluxed and brazed control materials to the NaF treated Ca-containing alloys, the Ca-containing alloys developed larger fillets, as depicted in FIG. 6. Calcium containing alloys treated with NaF consistently developed fillets that were 200% to 300% larger than the control material treated similarly. The Li-containing filler metal typically formed tangential fillets that were about the same size or slightly smaller than the control material under all treatment conditions. All the KF treated materials developed smaller upright fillets than the NOCOLOK fluxed and brazed control material.

Small additions of Ca to the filler metal clearly has a beneficial effect when the alloys are NaF treated and brazed in dry N$_2$. A similar effect was also observed when the Ca alloys were treated with KF, however, the effect on fillet size was less pronounced. In all cases, the fluoride treated materials, including the control, developed acceptable fillets when brazed in dry N$_2$ without flux. This positive result was unexpected.

TABLE 4

Fluoride treatments applied to the experimental brazing sheet.

| Condition ↓  Alloy → | La-bel | 0.022% Ca | 0.05% Ca | 0.039% Li | Control No Mg, Li, Ca |
|---|---|---|---|---|---|
| Fluxed at 2 g/m² | B | 2 | 2 | 2 | X |
| Fluxed at 1 g/mˣ | C | X | X | X | X |
| 0.25% NaF Etched, No Flux at 200° F. for 15 seconds | D | X | X | X | X |
| 0.1% NaF Etched, No Flux at 200° F. (93° C.) for 15 Sec. | E | X | X | X | X |
| 0.1% NaF Etched, No Flux at 158° F. (70° C.) for 60 Sec. | F | X | X | X | X |
| 0.1% NaF Etched, No Flux at 140° F. (60° C.) for 180 Sec. | G | X | X | X | X |
| 0.05% NaF Etched, No Flux at 200° F. (93° C.) for 15 Sec. | H | X | X | X | X |
| 0.05% NaF Etched, No Flux at 200° F. (93° C.) for 60 Sec. | I | X | X | X | X |
| 5% KF Etched at 200° F. for 15 seconds | J | X | X | X | X |
| 1.0% KF Etched at 200° F. (93° C.) for 15 Sec. | K | X | X | X | X |
| 1.0% KF Etched at 158° F. (70° C.) for 60 Sec. | L | X | X | X | X |
| 0.5% KF Etched at 200° F. (93° C.) for 60 Sec. | N | X | X | X | X |

TABLE 5

NaF treated box ring sample average upright fillet areas, square inches.

| Filler ---><br>Fluoride ↓ | 0.022% Ca | 0.05% Ca | 0.04% Li | Control |
|---|---|---|---|---|
| D | 0.00020 | 0.00027 | 0.00011 | 0.00084 |
| E | 0.00023 | 0.00029 | 0.00017 | 0.00001 |
| F | 0.00010 | 0.00007 | 0.00026 | 0.00008 |
| G | 0.00026 | 0.00014 | 0.00008 | 0.00000 |
| H | 0.00043 | 0.00029 | 0.00011 | 0.00000 |
| I | 0.00008 | 0.00010 | 0.00002 | 0.00000 |
| B | 0.00015 | 0.00043 | 0.00026 | 0.00010 |
| C | 0.00000 | 0.00000 | 0.00000 | 0.00008 |

TABLE 6

KF treated box ring sample average upright fillet areas, square inches.

| Filler ---><br>Fluoride ↓ | 0.022% Ca | 0.05% Ca | 0.04% Li | Control |
|---|---|---|---|---|
| J | 0.00066 | 0.00032 | 0.00015 | 0.00027 |
| K | 0.00016 | 0.00020 | 0.00000 | 0.00000 |
| L | 0.00028 | 0.00026 | 0.00049 | 0.00000 |
| N | 0.00021 | 0.00025 | 0.00000 | 0.00000 |
| B | 0.00015 | 0.00043 | 0.00026 | 0.00010 |
| C | 0.00000 | 0.00000 | 0.00000 | 0.00008 |

TABLE 7

NaF treated box ring sample tangential fillets areas, square inches.

| Filler ---><br>Fluoride ↓ | 0.022% Ca | 0.05% Ca | 0.039% Li | Control |
|---|---|---|---|---|
| D | 0.00435 | 0.00440 | 0.00201 | 0.00160 |
| E | 0.00431 | 0.00352 | 0.00174 | 0.00109 |

TABLE 7-continued

NaF treated box ring sample tangential fillets areas, square inches.

| Filler ---><br>Fluoride ↓ | 0.022% Ca | 0.05% Ca | 0.039% Li | Control |
|---|---|---|---|---|
| F | 0.00443 | 0.00328 | 0.00124 | 0.00130 |
| G | 0.00318 | 0.00324 | 0.00064 | 0.00129 |
| H | 0.00450 | 0.00444 | 0.00166 | 0.00000 |
| I | 0.00374 | 0.00401 | 0.00082 | 0.00000 |
| B | 0.00074 | 0.00069 | 0.00049 | 0.00282 |
| C | 0.00000 | 0.00000 | 0.00000 | 0.00346 |

TABLE 8

KF treated box ring sample tangential fillets areas, square inches.

| Filler ---><br>Fluoride ↓ | 0.022% Ca | 0.05% Ca | 0.04% Li | Control |
|---|---|---|---|---|
| J | 0.00541 | 0.00541 | 0.00276 | 0.00609 |
| K | 0.00018 | 0.00016 | 0.00007 | 0.00005 |
| L | 0.00013 | 0.00019 | 0.00004 | 0.00005 |
| M | 0.00000 | 0.00000 | 0.00000 | 0.00000 |
| N | 0.00018 | 0.00013 | 0.00005 | 0.00006 |
| B | 0.00074 | 0.00069 | 0.00049 | 0.00282 |
| C | 0.00000 | 0.00000 | 0.00000 | 0.00346 |

The present invention has been described with reference to specific embodiments. However, this application is intended to cover those changes and substitutions which may be made by those skilled in the art without departing from the spirit and the scope of the appended claims.

What is claimed is:

1. A process for controlled atmosphere brazing, comprising:
    brazing an aluminum alloy using flux under controlled atmosphere brazing conditions, using a filler alloy comprising aluminum and between 0.005 and 0.3% calcium and 1 and 14% silicon.

2. A process for controlled atmosphere brazing according to claim 1, further comprising:
    between 0.0001% and 0.4% magnesium; between 0.0001% and 0.3% lithium; less than 0.5% iron; less than 1.0% manganese; less than 0.25% zinc; and no more than 0.15% impurities.

3. A process for controlled atmosphere brazing according to claim 2, wherein the filler alloy comprises:
    between 0.005 and 0.1% calcium; between 7 and 12% silicon; between 0.04% and 0.1% magnesium; between 0.01% and 0.06% lithium; less than 0.3% iron; less than 0.08% zinc; and no more than 0.15% impurities.

4. A process for controlled atmosphere brazing according to claim 2, wherein the filler alloy comprises between 0.005 and 0.05% calcium.

5. A process for controlled atmosphere brazing according to claim 1, further comprising
    pretreating the aluminum filler alloy with a wash using an aqueous solution of flouridic compounds.

6. A process for controlled atmosphere brazing in accordance with claim 5 wherein the fluoridic pretreatment further comprises dissolving one or more of NaF, KF, NiF, CsF, and LiF compounds in water to form an aqueous solution, the concentrations of the compounds are between 5 wt. % and 0.005 wt. %,
    heating the aqueous solution to a temperature between 130° F. and 212° F., and immersing the aluminum filler alloy for a time ranging between 15 seconds and 300 seconds.

7. A process for controlled atmosphere brazing according to claim 2, further comprising
pretreating the aluminum filler alloy with a wash using an aqueous solution of flouridic compounds.

8. A process for controlled atmosphere brazing in accordance with claim 7 wherein the fluoridic pretreatment further comprises dissolving one or more of NaF, KF, NiF, CsF, and LiF compounds in water to form an aqueous solution, the concentrations of the compounds are between 5 wt. % and 0.005 wt. %,
heating the aqueous solution to a temperature between 130° F. and 212° F., and immersing the aluminum filler alloy for a time ranging between 15 seconds and 300 seconds.

9. A process for controlled atmosphere brazing according to claim 3, further comprising
pretreating the aluminum filler alloy with a wash using an aqueous solution of flouridic compounds.

10. A process for controlled atmosphere brazing in accordance with claim 9 wherein the fluoridic pretreatment further comprises dissolving one or more of NaF, KF, NiF, CsF, and LiF compounds in water to form an aqueous solution, the concentrations of the compounds are between 5 wt. % and 0.005 wt. %,
heating the aqueous solution to a temperature between 130° F. and 212° F., and immersing the aluminum filler alloy for a time ranging between 5 seconds and 300 seconds.

11. A process for controlled atmosphere brazing in accordance with claim 10 wherein the concentrations of the compounds in aqueous solution are between 1 wt. % and 0.05 wt. %, and the fluoridic pretreatment further comprises heating the aqueous solution to a temperature between 160° F. and 205° F., and immersing the aluminum filler alloy for a time ranging between 15 seconds and 60 seconds.

12. A process for controlled atmosphere brazing, comprising:
brazing an aluminum alloy using flux under controlled atmosphere brazing conditions, using a filler alloy comprising aluminum and between 0.005 and 1.0% calcium and 1 and 14% silicon.

13. A process for controlled atmosphere brazing according to claim 12, further comprising:
between 0.0001% and 0.4% magnesium; between 0.0001% and 0.3% lithium; less than 0.5% iron; less than 1.5% manganese; less than 0.25% zinc; and no more than 0.15% impurities.

14. A process for controlled atmosphere brazing in accordance with claim 13 wherein the fluoridic pretreatment further comprises dissolving one or more of NaF, KF, NiF, CsF, and LiF compounds in water to form an aqueous solution, the concentrations of the compounds are between 5 wt. % and 0.005 wt. %,
heating the aqueous solution to a temperature between 120° F. and 212° F., and immersing the aluminum filler alloy for a time ranging between 5 seconds and 300 seconds.

* * * * *